(12) United States Patent
Matsubara et al.

(10) Patent No.: US 7,326,497 B2
(45) Date of Patent: Feb. 5, 2008

(54) GRAPHITE-CONTAINING COMPOSITION, NEGATIVE ELECTRODE FOR A LITHIUM SECONDARY BATTERY, AND LITHIUM SECONDARY BATTERY

(75) Inventors: Keiko Matsubara, Yokohama (JP); Toshiaki Tsuno, Yokohama (JP); Akira Takamuku, Yokohama (JP); Kyou-Yoon Sheem, Ohsan (JP)

(73) Assignee: Samsung SDI Co., Ltd., Suwon-si (KR)

( * ) Notice: Subject to any disclaimer, the term of this patent is extended or adjusted under 35 U.S.C. 154(b) by 379 days.

(21) Appl. No.: 10/327,752

(22) Filed: Dec. 23, 2002

(65) Prior Publication Data

US 2004/0072076 A1 Apr. 15, 2004

(30) Foreign Application Priority Data

Dec. 21, 2001 (JP) ............................. 2001-388815
Dec. 21, 2001 (JP) ............................. 2001-388816

(51) Int. Cl.
*H01M 4/58* (2006.01)
*H01M 4/88* (2006.01)
*H01M 4/00* (2006.01)

(52) U.S. Cl. ............................. 429/231.8; 429/231.95; 429/217; 29/623.5; 29/623.1; 252/182.1

(58) Field of Classification Search ............ 429/231.8, 429/231.95, 217; 29/623.5, 623.1; 252/182.1
See application file for complete search history.

(56) References Cited

U.S. PATENT DOCUMENTS 6,139,990 A * 10/2000 Kubota et al. ............ 429/231.8

6,638,662 B2 * 10/2003 Kaneda et al. ........... 429/231.8
2002/0110735 A1 * 8/2002 Farnham et al. ............ 429/199

FOREIGN PATENT DOCUMENTS

| JP | 6-297431 | 10/1994 |
|---|---|---|
| JP | 8-321306 | 12/1996 |
| JP | 9-245770 | 9/1997 |
| JP | 9-306477 | 11/1997 |
| JP | 10-321219 | 4/1998 |
| JP | 10-188959 | 7/1998 |
| JP | 10-321219 | * 12/1998 |
| JP | 10-0284952 | 10/1999 |

(Continued)

OTHER PUBLICATIONS

Patent Abstracts of Japan; Publication No. 11-317229; Publication Date Nov. 16, 1999; in the name of Choi et al.

(Continued)

*Primary Examiner*—Patrick Joseph Ryan
*Assistant Examiner*—Angela J. Martin
(74) *Attorney, Agent, or Firm*—Christie, Parker & Hale, LLP

(57) ABSTRACT

Disclosed is a negative electrode for a lithium secondary battery which is prepared by mixing graphite powder with a binder. The negative electrode comprises graphite with an intensity ratio I(110)/I(002) of 0.5 or more wherein I(002) is an X-ray diffraction peak intensity I(002) at a (002) plane and I(110) is an X-ray diffraction peak intensity I(110) at a (110) plane The negative electrode for a lithium secondary battery has enhanced discharge capacity and cycle life characteristics.

6 Claims, 5 Drawing Sheets

FOREIGN PATENT DOCUMENTS

| | | |
|---|---|---|
| JP | 11-317229 | 11/1999 |
| JP | 2000-226206 | 8/2000 |
| JP | 2001-283844 * | 10/2001 |

OTHER PUBLICATIONS

Patent Abstracts of Japan; Publication No. 2000-226206; Publication Date Aug. 15, 2000; in the name of Eto et al.

Patent Abstracts of Japan; Publication No. 2001-283844; Publication Date Oct. 12, 2001; in the name of Shoji et al.

Patent Abstract of Japan, Publication Number. 10-321219, published Apr. 12, 1998, in the name of Suketani Shigenori, et al.

Patent Abstracts of Japan, Publication No. 06-297431, dated Oct. 25, 1994, in the name of Masato Sagawa et al.

Patent Abstracts of Japan, Publication No. 08-321306, dated Dec. 3, 1996, in the name of Soichiro Kawakami.

Patent Abstracts of Japan, Publication No. 09-245770, dated Sep. 19, 1997, in the name of Masatoshi Takahashi.

Patent Abstracts of Japan, Publication No. 09-306477, dated Nov. 28, 1997, in the name of Hide Koshina, et al.

Patent Abstracts of Japan, Publication No. 10-188959, dated Jul. 21, 1998, in the name of Yoshisto Ishii, et al.

* cited by examiner

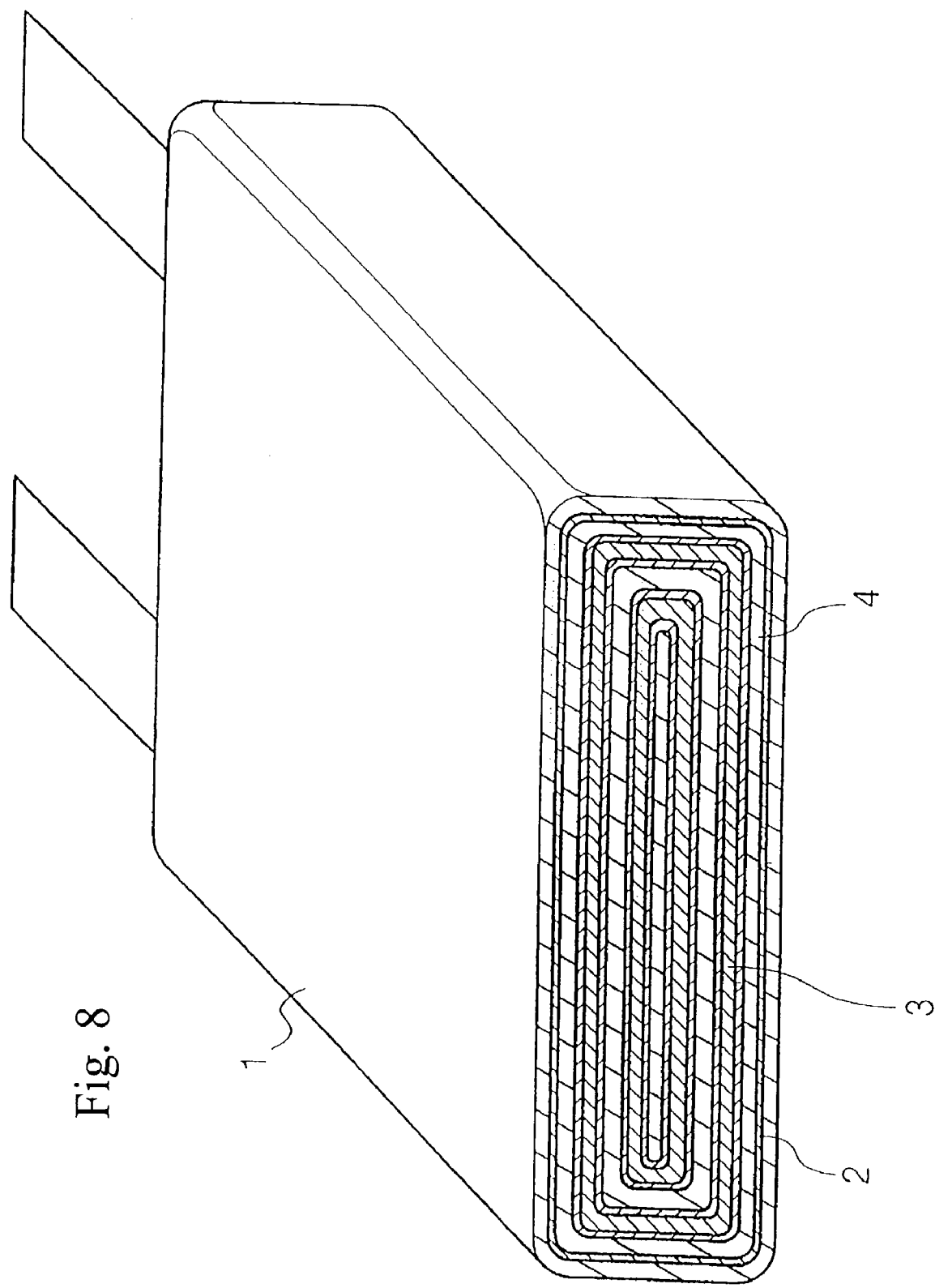

GRAPHITE-CONTAINING COMPOSITION, NEGATIVE ELECTRODE FOR A LITHIUM SECONDARY BATTERY, AND LITHIUM SECONDARY BATTERY

CROSS REFERENCE TO RELATED APPLICATIONS

This application claims priority of Japanese Patent Application Nos. 2001-388815 and 2001-388816, filed on Dec. 21, 2001, in the Japanese Patent Office, the disclosures of which are incorporated herein by reference.

FIELD OF THE INVENTION

The present invention relates to a graphite-containing composition, a negative electrode for a lithium secondary battery comprising the composition, and a lithium secondary battery comprising the negative electrode.

BACKGROUND OF THE INVENTION

Carbon-based materials are used for negative active materials, and in particular, crystalline graphite with high crystallinity is generally used. This graphite has a layered structure, and lithium ions are intercalated from the edge of the layered graphite to the intervals of graphite layers during charging of a secondary battery, thereby producing a Li-graphite intercalation compound.

When graphite is used as a negative active material to prepare a negative electrode, the planes of the graphite layers are parallel to the plane of the collector, since most graphite is flake-shaped. Therefore, the edges of the graphite layers are aligned in a direction perpendicular to the positive electrode, and therefore lithium ions which are deintercalated from the positive electrode cannot easily intercalate to the graphite layers during charging.

In particular, when a, battery is charged at a high rate, lithium ions are insufficiently intercalated to the graphite layers, and discharge characteristics consequently deteriorate.

In addition, since a lithium secondary battery is generally charged under constant current and constant voltage (CC-CV) and it is discharged under constant current, lithium ions which are deeply intercalated to the crystalline graphite layers are not fully deintercalated when the battery is discharged at high rates, thereby deteriorating cycle life characteristics.

Cycle life characteristics of a conventional lithium secondary battery further deteriorate because the lithium ions that deintercalate are insufficient to intercalate to the graphite layers, and too many lithium ions remain in the graphite.

Electrical resistivity of a graphite-containing composition in the inner plane direction of a graphite layer (an (ab) plane or a (002) plane) is about 1000 times than that of in the plane direction of the graphite layer. Therefore, if the alignment of graphite can be controlled, anisotropy of graphite may decrease or it may be eliminated, and the graphite can be used in electronic appliances as well as in batteries.

SUMMARY OF THE INVENTION

In one embodiment, the present invention is directed to a negative electrode for a lithium secondary battery comprising a graphite-containing composition that is prepared by mixing a graphite powder and a binder, and solidifying and shaping the mixture into a sheet with a density of 1.5 to 2.0 g/cm$^3$, wherein the graphite has an intensity ratio I(110)/I(002) (%) of 0.5 or more, wherein I(002) is an X-ray diffraction peak intensity I(002) at a (002) plane and I(110) is an X-ray diffraction peak intensity I(110) at a (110) plane when the sheet plane is measured by X-ray diffraction.

The negative electrode for a lithium secondary battery of the present invention enhances discharge capacity at high rate charge/discharge and cycle life characteristics of the lithium secondary battery.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein:

FIG. 8 is a perspective view of a battery according to the invention.

DETAILED DESCRIPTION OF THE INVENTION

Figure 1:
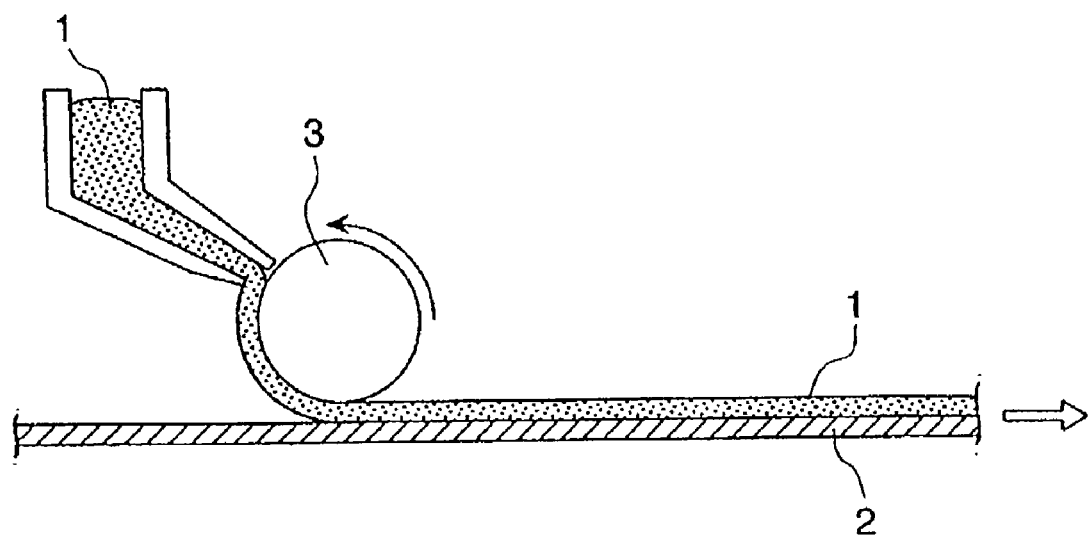
FIG. 1 is a schematic diagram illustrating a process for producing a negative electrode for a lithium secondary battery of an Example according to the present invention.

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

Graphite has diamagnetically susceptible anisotropy, and when a magnetic field is applied perpendicularly to a (002) plane of graphite, its diamagnetic susceptibility is about 40 to 50 times as much as when it is applied perpendicularly to a (110) plane of graphite. Therefore, when the energy of the graphite is stabilized in the magnetic field, the (002) plane of the graphite particles rotates in the direction parallel to the magnetic field.

Basically, when graphite is used for a negative active material, a portion of bulky graphite with high crystallinity is removed, and X-ray diffraction data on the (002) plane of graphite mostly shows the graphite particles aligned in the direction of the (ab) plane of the graphite particles, even though the (002) plane is not the same as the (ab) plane.

In addition, graphite has high anisotropy in electrical conductivity, and the (ab) plane of the graphite layers has resistivity of 1000 times as much as that of the axis c (a direction perpendicular to the (ab) plane). When a negative electrode is prepared, the (002) plane of graphite is aligned in a direction perpendicular to a substrate, such as a collector, in the magnetic field, and it is molded. Therefore, since the edge of the graphite layer is aligned in the direction of the positive electrode, the intercalation and deintercalation of lithium ions may easily occur as the impedance of its electrodes deteriorates, thereby improving cycle life characteristics.

The present invention also provides a composition for a lithium secondary battery, comprising graphite with an intensity ratio I(110)/I(002) (%) of 0.5 or more wherein I(002) is an X-ray diffraction peak intensity I(002) at a (002) plane and I(110) is an X-ray diffraction peak intensity I(110) at a (110) plane.

The composition of the present invention is prepared by mixing a graphite powder and a binder, and solidifying and shaping the mixture into a sheet with a density of 1.5 to 2.0 g/cm$^3$, wherein the graphite has an intensity ratio I(110)/I(002) (%) of 0.5 or more, wherein I(002) is an X-ray diffraction peak intensity I(002) at a (002) plane and I(110) is an X-ray diffraction peak intensity I(110) at a (110) plane when the sheet plane is measured by X-ray diffraction.

The magnetic field applied-to the composition has the field strength of 0.5 T or more.

The (002) plane of graphite is perpendicular to a collector in a predetermined ratio to help lithium ions to be intercalated to the graphite.

The composition of the present invention may be used in various applications e.g. a lithium ion secondary battery, an electrode for a fuel cell, an electrode for electrical discharge machining, an electrode for an electrolyzing process, an electric double layer capacitor (DLC), a variable resistor, a carbon resistor, a shielding layer for an electric wave, or a printing circuit board.

Hereinafter, the preparation of a graphite-containing composition will be described in detail.

The composition of the present invention is prepared by mixing at least a graphite powder and a binder, and solidifying and shaping a mixture the graphite powder and the binder under a magnetic field to align the (002) plane of graphite particles in the same direction:

In the method of preparing the composition, it is preferred that the field strength in the application of the magnetic field is 0.5 T or more.

In addition, the application of the magnetic field is performed for 0.1 sec to 10 min, depending on the viscosity of the paste.

It is preferred that the solvent is removed by heating the paste to evaporate the solvent.

The method of preparing the composition of the present invention may be used in various applications, e.g. a lithium ion secondary battery, an electrode for a fuel cell, an electrode for electrical discharge machining, an electrode for an electrolyzing process, an electric double layer capacitor, a variable resistor, a carbon resistor, a shielding layer for an electric wave, or a printing circuit board.

Hereinafter, a negative electrode for a lithium secondary battery will be described in detail.

The negative electrode for a lithium secondary battery of the present invention is prepared by mixing a graphite powder and a binder, and solidifying and shaping the mixture into a sheet with a density of 1.5 to 2.0 g/cm$^3$, wherein the graphite has an intensity ratio I(110)/I(002) (%) of 0.5 or more, wherein I(002) is an X-ray diffraction peak intensity I(002) at a (002) plane and I(110) is an X-ray diffraction peak intensity I(110) at a (110) plane when the sheet plane is measured by X-ray diffraction.

Further, the negative electrode is prepared by dispersing the graphite powder and the binder in a solvent to prepare a paste, coating the paste on a substrate, applying a magnetic field to the paste to align the graphite particles, removing the solvent from the paste, and fixing the graphite particles with a binder.

The field applied to the negative electrode is 0.5 T or more.

The (002) plane of graphite is perpendicular to the collector in a predetermined ratio to help lithium ions to be intercalated to the graphite.

In particular, it is preferred that the negative electrode comprises graphite particles of which the (002) plane is aligned in a direction perpendicular to its sheet plane in order to help lithium ions to be intercalated to the graphite.

Hereinafter, a method of preparing the negative electrode for a lithium secondary battery of the present invention will be described in detail.

The method of preparing the negative electrode of the present invention comprises dispersing a graphite powder and a binder in a solvent to prepare a paste, coating the paste on a substrate, aligning the (002) plane of the graphite particles in the same direction with a magnetic field, removing the solvent from the composition, and solidifying and shaping the graphite powder with a binder.

According to the method of preparing the negative electrode, the (002) plane of the graphite particles is aligned in a direction perpendicular to its sheet plane.

The magnetic field is preferably applied by positioning the substrate and paste between a pair of means for generating a magnetic field.

In addition, the method of preparing the negative electrode comprises molding graphite on an electrode into a sheet-shape and aligning the (002) plane of graphite particles in a direction perpendicular to the sheet plane.

Therefore a graphite-containing composition with an intensity ratio I(110)/I(002) (%) of 0.5 or more is prepared, where I(002) is an X-ray diffraction peak intensity I(002) at a (002) plane, and I(110) is an X-ray diffraction peak intensity I(110) at a (110) plane, and the density of the graphite-containing composition ranges from 1.5 g/cm$^3$ to 2.0 g/cm$^3$.

The method of preparing a negative electrode according to the present invention comprises solidifying and shaping by pressurizing a mixed powder of a graphite powder and a binder in a magnetic field and thereby aligning the (002) plane between the graphite particles of the graphite power in the same direction.

It is preferred that the field strength in the application of the magnetic field is 0.5 T or more in the method of preparing the negative electrode of the present invention.

In addition, it is preferred that the application of the magnetic field is performed for 0.1 sec to 10 min, depending on the viscosity of the paste.

Also it is preferred that the solvent is removed by evaporation through heating the paste.

Hereinafter, a lithium secondary battery of the present invention will be described in detail.

The lithium secondary battery of the present invention comprises any one of the aforementioned negative electrodes.

In particular, the lithium secondary battery preferably comprises a positive electrode which is aligned in the intro-plane direction of the (002) plane of graphite in a negative electrode.

Hereinafter, a method of preparing the lithium secondary battery of the present invention will be described in detail.

The method of preparing a lithium secondary battery comprising a positive electrode and a negative electrode comprises dispersing a graphite powder and a binder in a solvent to prepare a paste, and coating the paste on a substrate, and applying a magnetic field to the coated substrate to align the (002) plane of graphite particles in the same direction, and removing the solvent from the applied substrate while maintaining the magnetic field, and solidifying and shaping the graphite powder with a binder to prepare a negative electrode, and aligning a positive electrode toward the (002) plane of the graphite particles on the negative electrode.

According to the method of preparing the lithium secondary battery, the negative electrode comprises graphite particles which are aligned in the direction of the (002) plane thereof, and the graphite particles of the positive electrode are also aligned in the direction of (002) plane. Therefore, it is possible that the lithium ions which are intercalated and deintercalated between the negative and positive electrodes are actively intercalated and deintercalated from the edge of the graphite layer to the graphite layer during charging of the lithium secondary battery.

The magnetic field is preferably made by positioning a substrate and paste between a pair of means for generating a magnetic field, e.g. magnets.

In addition, it is preferred that the graphite powders on the substrate are shaped into a sheet on the binder and that the (002) plane of the graphite particle of the graphite powder is aligned perpendicular to the sheet plane.

Hereinafter, the following Examples, Comparative Examples, and drawings further illustrate the present invention in detail, but are not to be construed to limit the scope thereof.

The graphite-containing composition of the present invention can be applied to a negative electrode for a lithium secondary battery. The negative electrode is prepared by dispersing a graphite powder and a binder in a solvent to prepare a paste, and coating the paste on a substrate, and applying a magnetic field to the paste coated with the graphite powder to align the (002) plane of graphite particles in the same direction, and removing the solvent from the substrate while maintaining the magnetic field, and solidifying and shaping the graphite powder with the binder.

In addition, the negative electrode preferably comprises a graphite-containing composition in which the direction of the (002) plane is aligned perpendicularly to a sheet plane. In particular it is preferred that the inner direction of the (002) plane is aligned in the direction of the positive electrode, when the negative electrode is applied to a lithium secondary battery comprising a positive electrode and electrolyte.

The negative electrode of the present invention is not limited to the sheet-shape, and it can have any suitable shape, such as a cylinder, a coin, a plate or a prism. It is preferred that the (002) plane of the graphite particles is aligned in the direction of the positive electrode.

Graphite has a hexagonal lattice-layered structure. During charging of a lithium secondary battery, lithium ions are intercalated into the layer, thereby producing a graphite intercalation compound. Generally, the direction of the plane that is made of the 6 bonded carbon atoms is referred to as the direction of (002) plane and the direction of the layered plane of the graphite layer is referred to as (002) or the plane (110).

Lithium ions are intercalated from the edge of the hexagonal graphite layer into the (002) plane, which is the inner direction of the plane.

In the present invention, as the (002) plane direction of the graphite particle of the graphite powder aligns to the direction of the positive electrode, lithium ions moving from the positive electrode intercalate to the graphite layer easily.

In addition, as the lithium ions move easily to the graphite, especially at a high rate current, the discharge capacity improves.

Also, when a battery is charged at a constant voltage, lithium ions which are deeply intercalated into graphite are totally discharged, and none of the lithium ions remain in the graphite, thereby improving the cycle life characteristics of the lithium secondary battery.

Graphite with high crystallinity is preferably used, e.g. graphite with an intensity ratio I(110)/I(002) (%) of 0.5 or more, wherein I(002) is an X-ray diffraction peak intensity I(002) at a (002) plane and I(110) is an X-ray diffraction peak intensity I(110) at a (110) plane of 1.0. That is, the graphite structure preferably has a hexagonal lattice layer, and with this structure, a battery with stable discharge voltages and a high charge capacity may be prepared.

Preferred examples of the graphite include natural graphite, artificial graphite, and thermal decomposition graphite, etc.

The binder of the present invention includes an organic binder and an inorganic binder. Any binder can be used so long as it is dispersible or soluble in a solvent with graphite powders, and it binds the graphite powders. In addition, a binder that can make a graphite powder bond by mixing the binder and graphite powder together and molding the mixture with pressure can be used. Preferred examples of the binder include vinyl cellulose, cellulose resin, phenol resin, thermoplastic resin, and thermosetting resin, e.g. polyvinylidene, polyvinylalcohol, carboxymethylcellulose, and styrenebutadiene rubber.

It is preferred that the negative electrode further comprises a conductive agent such as Carbon Black.

It is preferred that the negative electrode comprises a graphite-containing composition with an intensity ratio I(110)/I(002) (%) of 0.5 or more wherein I(002) is an X-ray diffraction peak intensity I(110) at a (110) plane, and a density of 1.5 to 2.0 $g/cm^3$.

When the I(110)/I(002) ratio (%) is 0.5 or more, the (002) plane of graphite particles is aligned in the direction perpendicular to the sheet plane which is the measured plane.

Therefore, the lithium ion secondary battery comprises graphite particles of which the (002) plane is aligned in the direction of a positive electrode, and wherein lithium ions easily move from the positive electrode to intercalate to the graphite layer. In particular, cycle life characteristics of such a battery are enhanced during charging at high rates.

In addition, it is more preferred that the I(110)/I(002) (%) ratio is 10 or less. When the I(110)/I(002) (%) is over 10, cycle life characteristics of the battery may deteriorate, since the fixing area of the graphite and collector decreases.

But, it is not preferred that the density of the negative electrode is less than 1.5 $g/cm^3$ or less because the energy density of a lithium secondary battery may not be high. Although as the density of the negative electrode increases, the energy density becomes higher, a density of 2.0 $g/cm^3$ or less is sufficient.

The lithium secondary battery of the present invention comprises the negative electrode, a positive electrode, and an electrolyte.

The positive electrode of the present invention is preferably located in the direction the (002) plane of the graphite particles, that is, in the edge direction of the graphite particles, so that lithium ions can be freely intercalated or deintercalated from the edge of the graphite layer.

Preferred positive active materials for the present invention include organic sulfide compounds and organic polysulfide compounds that are capable of absorbing and releasing lithium ions, such as $LiMn_2O_4$, $LiCoO_2$, $LiNiO_2$, $LiFeO_2$, $V_2O_5$, TiS, and MoS and the like.

It is preferred that the positive electrode further comprises a binder such as polyvinylidene fluoride and a conductive agent such as Carbon Black.

The positive electrode and negative electrode can be prepared by coating an active material on a metallic film collector or a metallic film net, and shaping it into a sheet.

In addition, conventional positive and negative electrodes can be used.

The preferred electrolytes include an organic electrolyte that is prepared by dissolving a lithium salt in a nonaqueous solvent.

Preferred examples of nonaqueous solvents include compounds selected from the group consisting of propylenecarbonate, ethylenecarbonate, butylenecarbonate, benzonitrile, acetonitrile, tetrahydrofurane, 2-methyltetrahydrofurane, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, dimethylcarbonate, methylethylcarbonate, diethylcarbonate, methylpropylcarbonate, methylisopropylcarbonate, ethylbutylcarbonate, dipropylcarbonate, diisopropylcarbonate, dibutylcarbonate, diethyleneglycol, dimethylether, and mixtures thereof. It is preferred that the solvent includes both a solvent selected from the group consisting of propylenecarbonate, ethylenecarbonate, and butylene carbonate, and a solvent selected from the group consisting of dimethylcarbonate, methylethylcarbonate, and diethylcarbonate.

Lithium salt is used as a solute for the electrolyte. Preferred lithium salts include one or more selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), LiCl, and LiI. Preferably, the lithium salt includes one of $LiPF_6$ and $LiBF_4$.

Also, the lithium secondary battery of the present invention may comprise a conventional organic electrolyte.

Preferably, the electrolyte for the present invention includes a polymer electrolyte where an acryl-based polymer, such as polyethylene oxide (PEO) or polyvinylacrylate (PVA), is impregnated in an organic solvent.

The lithium secondary battery of the present invention does not have to include only a positive electrode, a negative electrode, and an electrolyte, and it may further include other elements, e.g. a separator that separates the positive electrode and the negative electrode, if needed.

The method of preparing a negative electrode of the Example according to the present invention will now be explained by way of figures.

Figure 2:
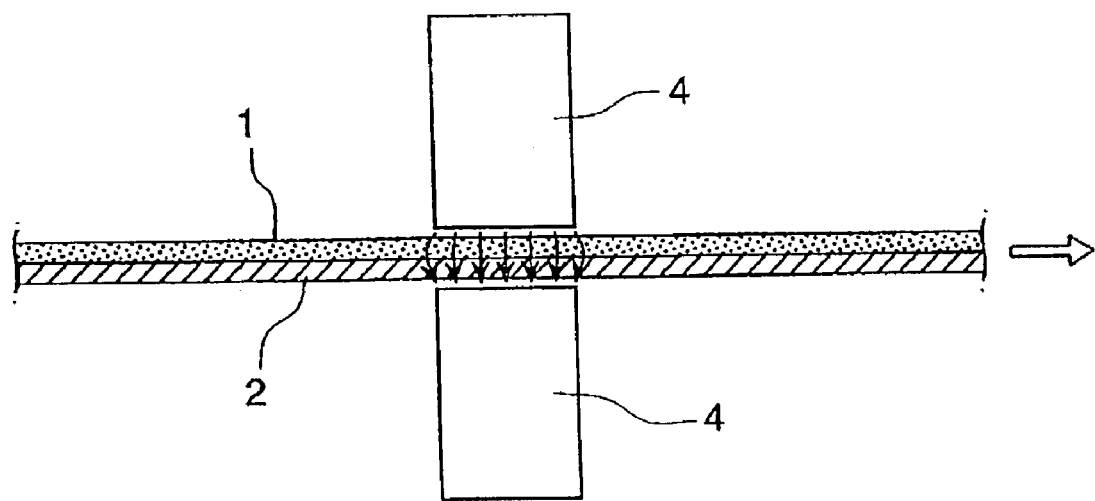
FIG. 2 is a schematic diagram illustrating a process for producing a negative electrode for a lithium secondary battery of an Example according to the present invention.
Figure 3:
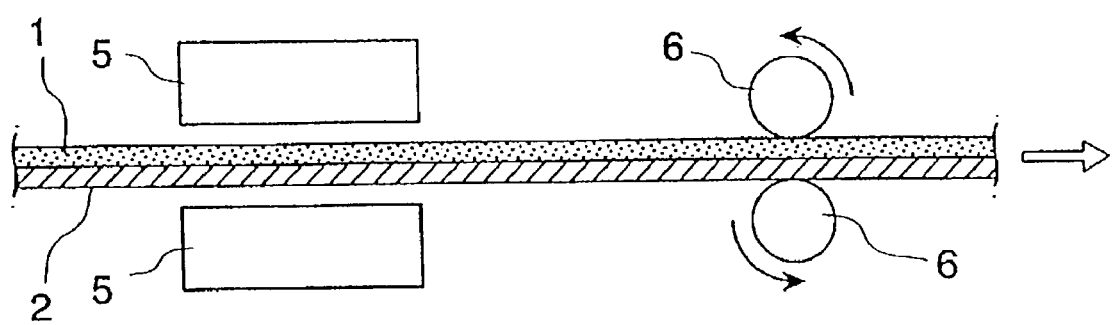
FIG. 3 is a schematic diagram illustrating a process for producing a negative electrode for a lithium secondary battery of an Example according to the present invention.

FIGS. 1 to 3 show schematic diagrams illustrating the production process for a sheet-shaped negative electrode for a lithium secondary battery of an Example according to the present invention.

As shown in FIG. 1, graphite, a binder and a solvent are mixed together to prepare a paste 1, and the paste 1 is coated on a copper film collector (substrate) 2 with an applicator roller 3.

It is preferred that the graphite powder in the past 1 is high-crystalline graphite with an intensity ratio I(110)/(002) (%) of an X-ray diffraction peak intensity I(002) at a (002) plane to an X-ray diffraction peak intensity I(110) at a (110) plane of 1.0 or more. Preferred examples of graphite include natural graphite, artificial graphite, and thermal decomposition graphite.

Suitable binders for the present invention include organic binders and inorganic binders. Any binder can be used so long as it is dispersible or soluble in a solvent with graphite powders, and it causes the graphite powder to bond upon elimination of the solvent. Preferred examples of binder include vinyl resin, cellulose resin, phenol resin, thermoplastic resin, and thermosetting resin, e.g. polyvinylidene fluoride, polyvinylalcohol, carboxymethylcellulose, and styrenebutadiene rubber.

It is preferred that the negative electrode further comprises a conductive agent such as Carbon Black.

It is preferred that a solvent that makes the graphite powder and the binder disperse uniformly is used. More preferably, a solvent that dissolves the binder is used. Preferred examples of solvent include N-methylpyrrolidone and water.

As shown in FIG. 2, a magnetic field of 0.5 T or more is applied to the collector 2 and the paste 1 before the solvent in the paste is volatilized.

Before the solvent is volatilized, the graphite is dispersed in the paste and it is not molded. That is, the (002) plane of each graphite particle has an irregular alignment.

When the graphite with an irregular alignment is placed in a magnetic field, the (002) plane of the graphite particles is aligned in one direction by a magnetic anisotropic moment. The regularity of the magnetic field alignment depends on the intensity of the magnetic field, and the viscosity and crystallinity of the graphite.

The magnetic field applied to the paste preferably comprises homogeneous lines of magnetic force where the lines of magnetic force are parallel. When the lines of magnetic force are not homogeneous, it is not preferred since the (002) plane of graphite is not easily aligned in one direction.

Therefore, as shown in FIG. 2, the magnetic field is preferably made by placing the collector 2 and the paste 1 between a pair of magnets 4, 4, the magnets producing lines of magnetic force in the direction of the arrows between the pair of magnets 4, 4.

It is preferred that the field strength in the application of the magnetic field is 0.5 T or more, and more preferably 1 T or more. When the field strength is less than 0.5 T, it is difficult to align the (002) plane of the graphite in one direction. The upper limit of the field strength is not limited to a particular range, but it is preferably 2.5 T. Substantially, the upper limit of the field strength depends on properties of the magnet used, and instead of the aforementioned magnet, a superconductive magnet may be used in the present invention.

The application time of the magnetic field preferably ranges from a few seconds to a few minutes, and more preferably ranges from 0.1 seconds to 10 minutes.

As shown in FIG. 3, the paste 1 and collector 2 are placed in a heater 5 to remove the solvent 5 from the paste. After eliminating the solvent, only the graphite and binder remain on the collector 2, and the graphite is thereby coated on the collector.

Since the collector 2 is placed in the heater 5 with the (002) plane of the graphite particles aligned in one direction by the magnetic field, the alignment of graphite particles is maintained.

As shown in FIG. 3, the collector 2 is taken out of the heater 5 and is pressed with a press roller 6.

The collector 2 is then cut into a predetermined size to prepare a negative electrode.

Figure 4:
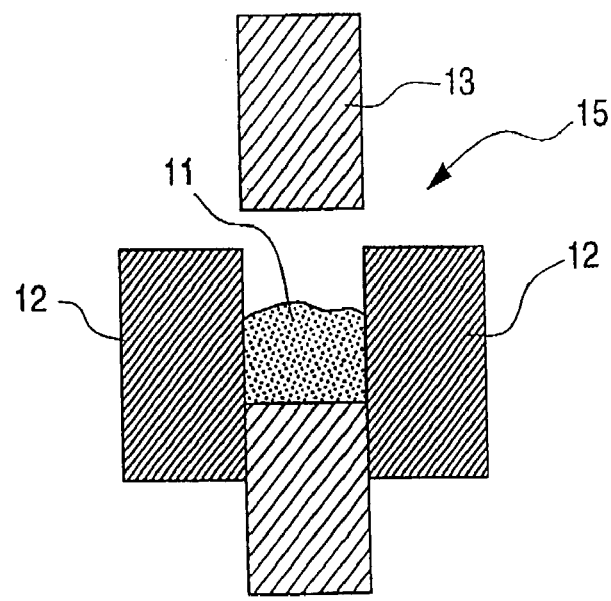
FIG. 4 is a schematic diagram illustrating a process for producing a negative electrode for a lithium secondary battery of an Example according to the present invention.
Figure 5:
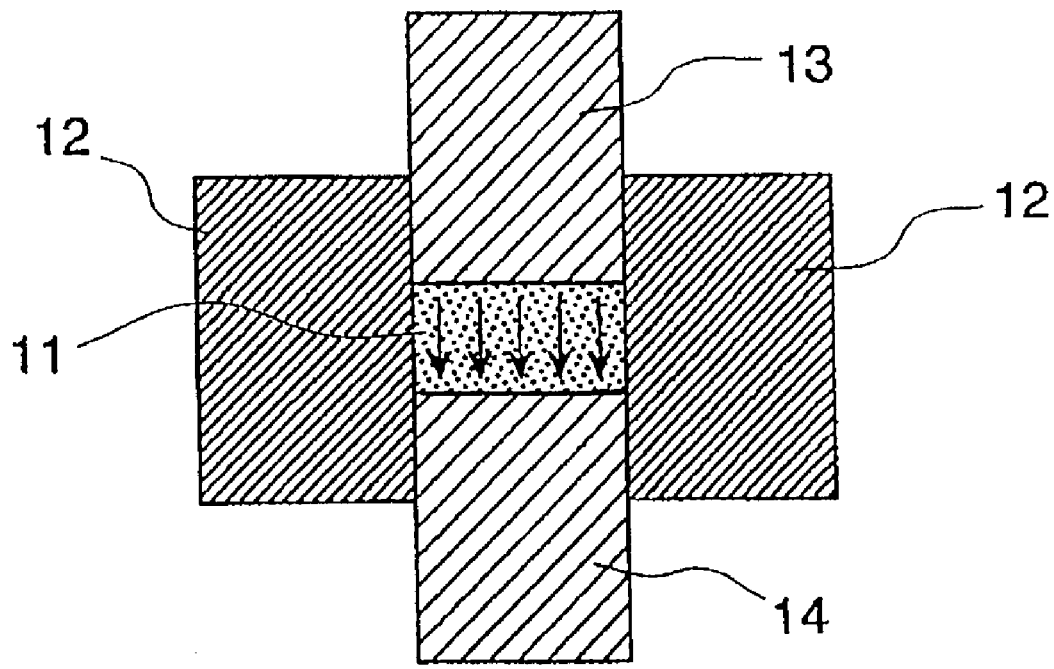
FIG. 5 is a schematic diagram illustrating a process for producing a negative electrode for a lithium secondary battery of an Example according to the present invention.
Figure 6:
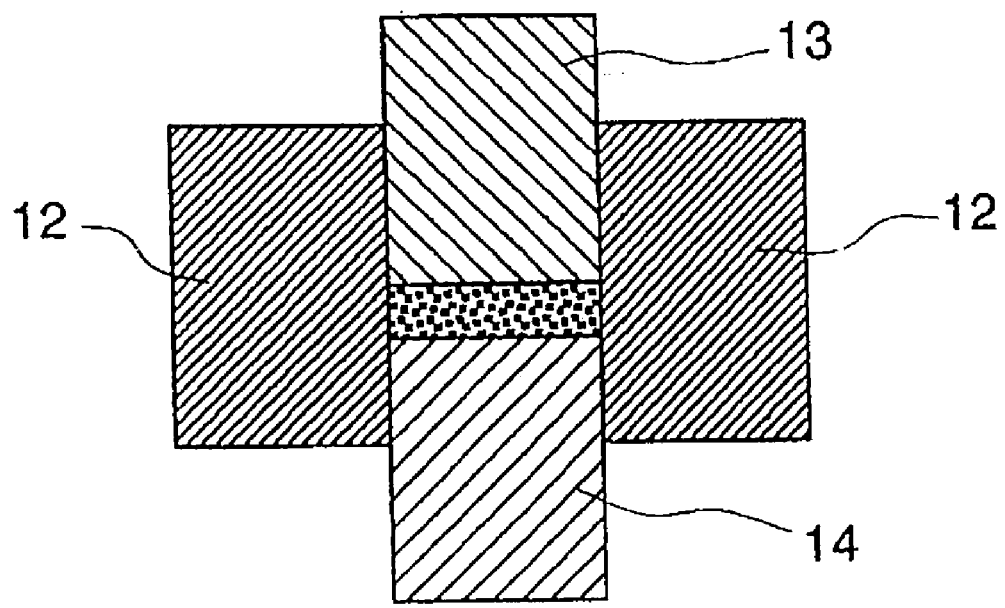
FIG. 6 is a schematic diagram illustrating a process for producing a negative electrode for a lithium secondary battery of an Example according to the present invention.

A method of preparing a negative electrode according to another example will be described with figures. FIGS. 4 to 6 show schematic diagrams illustrating a production process of a pellet-shaped negative electrode for a lithium secondary battery of an Example according to the present invention.

As shown in FIG. 4, a mixture of graphite and binder (a powder 11) is used, and it is placed in a mold 15 equipped with a hollow-cylinder molder 12, an upper punch 13 and lower punch 14.

A means for generating a magnetic field is formed in the upper punch 13 and lower punch of the mold 15, and it is not shown in the figure.

In order to prevent leakage of a line of magnetic force and to generate a homogeneous magnetic field, the hollow-cylinder molder 12 is preferably made of a non-magnetic material.

The graphite and binder in the mixture 11 includes the aforementioned materials. The negative electrode of the present invention may further comprise a conductive agent such as Carbon Black.

As shown in FIG. 5, while the upper punch 13 moves down to compress the mixture 11 between the upper punch 13 and lower punch 14, a magnetic field is generated by a magnet.

When the magnetic field is generated, the (002) plane of graphite particles in the mixture 11 that is aligned in a non-homogeneous direction is aligned in the direction of the line of magnetic force. The homogeneous alignment of the (002) plane results from the magnetic anisotropy moment of graphite in a diamagnetically susceptible region.

The magnetic field applied to the mixture 11 is preferably homogeneous, that is, the lines of magnetic force are parallel. When the lines of magnetic force are aligned in multiple directions, the graphite particles are aligned in multiple directions, and the planes (002) of graphite particles are therefore not aligned in one direction.

As shown in FIG. 5, the magnetic field is preferably generated in a hollow-cylinder molder 12 formed from a nonmagnetic material, thereby preventing the lines of magnetic force from leakage and applying a homogeneous magnetic field to the mixture 11.

The field strength in the application of the magnetic field is preferably 0.5 T or more, and more preferably 1.0 T or more. The application time of the magnetic field preferably ranges from a few seconds to a few minutes, e.g. 0.1 seconds to 10 minutes.

As shown in FIG. 6, the upper punch 13 continues to move down to compress the mixture 11 more densely between the upper punch 13 and lower punch 14, and the mixture 11 is bonded to the binder. While maintaining the alignment direction of the graphite particles in order to align the (002) plane of the graphite particles in the direction of the magnetic field, the mixture 11 is allowed to harden to prepare a pellet type negative electrode.

A lithium secondary battery of the present invention may be prepared by injecting an electrolyte between the positive electrode 3 and negative electrode 4, as shown in FIG. 8. The positive electrode 3 and negative electrode 4, along with a separator 2 and the electrolyte are put into a case 1 to fabricate a rechargeable lithium cell.

The negative and positive electrodes are located together, and the edge planes of the graphite particles in the negative electrode are aligned in the direction of the positive electrode. Therefore, lithium ions may freely move between the positive and negative electrodes. Hereinafter, the following Examples, Comparative Examples, and drawings further illustrate the present invention in detail, but they are not to be construed to limit the scope thereof.

A lithium secondary battery is prepared according to the aforementioned method shown in FIGS. 1 to 3.

Natural graphite powder was used as a negative material, and the intensity ratio $I(110)/I(002)$ (%) of an X-ray diffraction peak intensity $I(002)$ at a (002) plane to an X-ray diffraction peak intensity $I(110)$ at a (110) plane of natural graphite powder was 3.0.

96 parts by weight of natural graphite were mixed with 2 parts by weight of stryrenebutadiene rubber, 2 parts by weight of carboxymethylcelluose, and 130 parts by weight of water, and the mixture was stirred for 15 minutes to prepare a slurry paste. As shown in FIG. 1, the paste was coated on a copper film collector with a thickness of 14 μm. As shown in FIG. 2, the collector was located between a pair of magnets, a means for generating a magnetic field, and a magnetic field of 2.3 T was applied to the collector for 2 minutes.

As shown in FIG. 3, the paste and copper film collector were heated and dried in a heater at 60° C. for 30 minutes to evaporate the solvent, and then they were further dried at 120° C. for 24 hours. The coated film collector was pressed with a roller press to prepare a sheet-shaped negative electrode with a thickness of 90 μm and a density of 1.5 g/cm$^3$.

The sheet plane of the negative electrode was analyzed by X-ray diffraction, and the $I(110)/I(002)$ ratio of the negative electrode was measured on an X'pert pro X-ray diffractometer (Phillips Co.) using light having a wavelength of 1.5481A (CuKa) along the (002), (110) and other planes. X-ray diffraction intensity was measured with an Si internal standard. The results are represented in Table 1.

Negative electrodes for 13 mm diameter coin-type cells were prepared, lithium metal was used as a counter-electrode, and 6 coin-type cells (No. 1 to No. 6) were prepared by interposing a polypropylene separator between each negative electrode and a lithium metal positive electrode. The lithium metal positive electrode was located against the negative electrode.

The 6 coin-cells were charged at a constant current (CC) and a constant voltage (CV) for 1 cycle, and the cells were further charged and discharged for 4 cycles to activate the 6 coin-cells, and the 6 coin-cells were then charged and discharged for 50 cycles. The capacity retention (%) of the coin-cells after 50 cycles of charging and discharging compared to the first cycle of charging and discharging was measured, and the results are represented in Table 1.

For the 4 cycles, the cells were charged at 0.2 C until the charging voltage reached 0.001 V (vs. Li$^+$/Li), and the 6 coin-cells were further charged at a constant voltage until the charging current reached 0.01 C. The cells were discharged at 0.2 C until the discharging voltage reached 1.5 V (Li$^+$/Li).

For 50 cycles, the cells were further charged and discharged as in the 4 cycles except that the cells were charged and discharged at 1 C until the charging voltage reached 0.01 V.

TABLE 1

| No. | Field strength | I(110)/I(002) (%) Before pressing | I(110)/I(002) (%) After pressing | Capacity retention (%) of the cell after 50 cycles |
|---|---|---|---|---|
| 1 | 0 | 1.4 | 0.3 | 41.6 |
| 2 | 0.5 | 8.9 | 0.5 | 54.5 |
| 3 | 1 | 8.3 | 0.7 | 65.4 |
| 4 | 1.5 | 11.9 | 1.6 | 71.2 |
| 5 | 2.0 | 12.8 | 2.0 | 73.2 |
| 6 | 2.3 | 23.6 | 5.7 | 80.1 |

As shown in FIG. 1, the I(110)/I(002) (%), the X-ray diffraction ratio, increases as the field strength increases, and the I(110)/I(002) (%) ratio of cell No. 6, which was applied at 2.3 T, was about 19 times as much as that of cell No. 1, which did not have a magnetic field applied, and the (002) plane of graphite particles in cell No. 6 was appreciably aligned in the direction perpendicular to its sheet plane since the cell had a magnetic field applied.

In accordance with the field strength and capacity retention (%), when the field strength was 0.5 T, the capacity retention was enhanced by 54.5%, and when the field strength was 1 T, the capacity retention was enhanced by 73%.

Therefore, the field strength is preferably 0.5 T or more, and more preferably 1.0 T or more.

Figure 7:
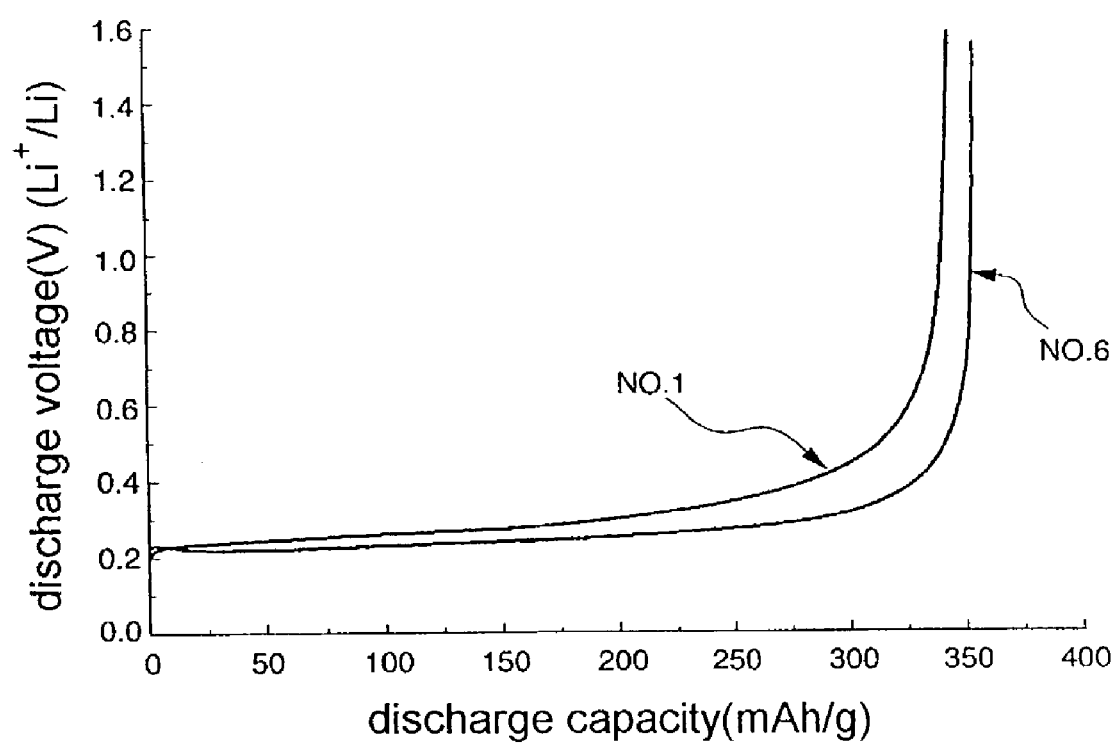
FIG. 7 is a graph showing discharge curves of the coin-type cells No. 1 and No. 6 after 5 cycles discharge.

FIG. 7 shows discharge curves of cells No. 1 to No. 6 at the 5th cycle, at 10 C charging and 10 C discharging.

As shown in FIG. 7, the potential of the negative electrode to lithium of cell No. 6 which was applied at 2.3 T was smaller than that of the negative electrode of cell No. 1. In cell No. 6, the I(110)/I(002) (%) ratio was high, and the edge of the hexagonal graphite layer was aligned to the lithium (positive electrode), so lithium ions could be reversibly deintercalated and the diffusion velocity of the lithium ions increased, and the anisotropy of the graphite and the impedance of the electrode decreased.

According to the graphite-containing composition of the present invention, the edge of the graphite layer is aligned in the direction of the positive electrode, and lithium ions freely intercalate and deintercalate and the cycle life characteristics are enhanced.

In addition, the discharge capacity of the negative electrode and the lithium secondary battery of the present invention improve since the edge of the graphite layers are aligned in the direction of the (002) plane of graphite particles, in the direction of the positive electrode, and the lithium ions from the positive electrode can be easily intercalated to the graphite layers. In addition, its discharge capacity may be enhanced since lithium ions are sufficiently intercalated to graphite during charging at high rates.

The cycle life characteristics of the graphite may also be improved because the lithium ions deeply-intercalated are totally deintercalated.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A negative electrode for a lithium secondary battery prepared by mixing a graphite powder and a binder, and solidifying and shaping the mixture into a sheet with a density of 1.5 to 2.0 g/cm$^3$, wherein the graphite is magnetically aligned using a magnetic field having a strength ranging from about 0.5 T to about 2.5 T, and wherein the graphite has an intensity ratio I(110)/I(002) ranging from about 0.5% to about 23.6%, wherein I(002) is an X-ray diffraction peak intensity I(002) at a (002) plane and I(110) is an X-ray diffraction peak intensity I(110) at a (110) plane, when the sheet plane is measured by X-ray diffraction.

2. The negative electrode for a lithium secondary battery according to claim 1, wherein the negative electrode is prepared by dispersing the graphite powder and binder in a solvent to prepare a paste, coating the paste on a substrate, applying a magnetic field to the coated substrate to align the graphite powder particles, and eliminating the solvent from the coated substrate to fix the graphite particles with the binder.

3. The negative electrode for a secondary battery according to claim 2, wherein the field strength in the application of the magnetic field is 0.5 T or more.

4. A lithium secondary battery comprising the negative electrode according to claim 1.

5. The negative electrode for a lithium secondary battery according to claim 1, wherein the graphite has an intensity ratio I(110)/I(002) of 1.6% or greater.

6. The negative electrode for a lithium secondary battery according to claim 1, wherein the graphite has an intensity ratio I(110)/I(002) ranging from 1.6% to 10%.

* * * * *